United States Patent
Gopshtein et al.

(10) Patent No.: US 9,678,764 B2
(45) Date of Patent: Jun. 13, 2017

(54) CLASSIFYING APPLICATION PROTOCOL INTERFACES (APIS) AS AFFECTING USER EXPERIENCE

(71) Applicant: HEWLETT PACKARD ENTERPRISE DEVELOPMENT LP, Houston, TX (US)

(72) Inventors: Michael Gopshtein, Yehud (IL); Amichai Nitsan, Yehud (IL); Boaz Shor, Yehud (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/128,140

(22) PCT Filed: Apr. 29, 2014

(86) PCT No.: PCT/US2014/035923
§ 371 (c)(1),
(2) Date: Sep. 22, 2016

(87) PCT Pub. No.: WO2015/167472
PCT Pub. Date: Nov. 5, 2015

(65) Prior Publication Data
US 2017/0097831 A1    Apr. 6, 2017

(51) Int. Cl.
*G06F 13/00* (2006.01)
*G06F 9/44* (2006.01)

(52) U.S. Cl.
CPC ............ *G06F 9/4443* (2013.01); *G06F 8/38* (2013.01)

(58) Field of Classification Search
CPC ......... G06F 9/4843; G06F 9/541; G06F 9/542
USPC .................... 718/100; 719/318, 328
See application file for complete search history.

(56) References Cited

U.S. PATENT DOCUMENTS

| | | |
|---|---|---|
| 9,092,332 B2 * | 7/2015 | Taylor ................. G06F 11/0787 |
| 2002/0144233 A1 | 10/2002 | Chong et al. |
| 2005/0149930 A1 | 7/2005 | Doggett |
| 2008/0134156 A1 | 6/2008 | Osminer et al. |
| 2008/0209451 A1 | 8/2008 | Michels et al. |
| 2012/0016662 A1 | 1/2012 | Boldyrev et al. |
| 2013/0151655 A1 | 6/2013 | Wu et al. |

(Continued)

OTHER PUBLICATIONS

Google, "Mobile Backend Starter—API Guide," (Web Page), Googie Cloud Platform, Sep. 7, 2013, 15 pages, available at https://cloud.google.com/developers/articles/mobile-backend-starter-api-reference.

(Continued)

*Primary Examiner* — Andy Ho

(57) ABSTRACT

Example embodiments relate to classifying application protocol interfaces (APIs) in terms of their relation to user experience. Example embodiments may determine that a user action occurred and monitor a first thread separate from a user interface (UI) thread of the computing device. The first thread may process a first API in response to the occurrence of the user action. A determination may be made as to whether the first API being processed on the first thread is related to the user action. Responsive to the first API being related to the user action, a determination may be made as to whether the first API causes the first thread to update the UI thread of the computing device. Responsive to the UI thread being updated, the first API may be tagged as affecting user experience.

15 Claims, 8 Drawing Sheets

(56) References Cited

U.S. PATENT DOCUMENTS

| | | |
|---|---|---|
| 2013/0191810 A1 | 7/2013 | Brandstetter et al. |
| 2014/0012965 A1 | 1/2014 | Ding et al. |
| 2014/0108963 A1* | 4/2014 | Black .................. G06F 3/04845 715/753 |
| 2014/0109064 A1 | 4/2014 | Gritter et al. |

OTHER PUBLICATIONS

International Search Report & Written Opinion received in PCT Application No. PCT/US2014/035923, Dec. 30, 2014, 9 pages.

Lawson, L., "Gartner: SOA Governance and API Management Markets Merging," (Web Page), Aug. 20, 2013, 3 pages, available at http://www.itbusinessedge.com/blogs/integration/gartner-soa-governance-and-api-management-markets-merging.html.

New Relic, Inc., "Real User Monitoring," (Web Page), May 17, 2011, 3 pages, available at https://docs.newrelic.com/docs/features/real-user-monitoring.

* cited by examiner

FIG. 7A

| USER ACTION IDENTIFIER | API IDENTIFIER | THREAD IDENTIFER | RELATED TO USER ACTION? | UPDATES MAIN UI? |
|---|---|---|---|---|
| USER ACTION 1 | API1 | THREAD A | YES | YES |
| USER ACTION 1 | API2 | THREAD C | NO | NO |
| USER ACTION 1 | API3 | THREAD B | YES | NO |
| USER ACTION 1 | API4 | THREAD C | YES | NO |
| USER ACTION 1 | API5 | THREAD A | NO | YES |
| USER ACTION 1 | API6 | THREAD B | YES | NO |
| USER ACTION 2 | API7 | THREAD D | YES | YES |
| USER ACTION 2 | API8 | THREAD D | YES | NO |

FIG. 7B

| USER ACTION IDENTIFIER | API IDENTIFIER | THREAD IDENTIFER | RELATED TO USER ACTION? | UPDATES MAIN UI? |
|---|---|---|---|---|
| USER ACTION 2 | API7 | THREAD D | YES | YES |
| USER ACTION 2 | API8 | THREAD D | YES | NO |

CLASSIFYING APPLICATION PROTOCOL INTERFACES (APIS) AS AFFECTING USER EXPERIENCE

BACKGROUND

Application owners, application developers, and other interested parties often want to analyze and improve user experience of their application. To that end, these parties often rely on client-side monitoring tools to collect data from an application at the client side and send that data to a server for analysis. A server may perform various analyses on the collected data to determine what collected data may affect user experience. The process to determine which of the collected data affects user experience and which parts of the application are associated with the pertinent collected data may be time consuming and may involve complicated processing.

BRIEF DESCRIPTION OF THE DRAWINGS

The following detailed description references the drawings, wherein:

FIG. 7A is an exemplary table depicting information related to APIs that may be executed in an application running on a client computing device; and FIG. 7B is an exemplary table depicting information related to APIs that may be executed in an application running on a client computing device.

DETAILED DESCRIPTION

Figure 1:
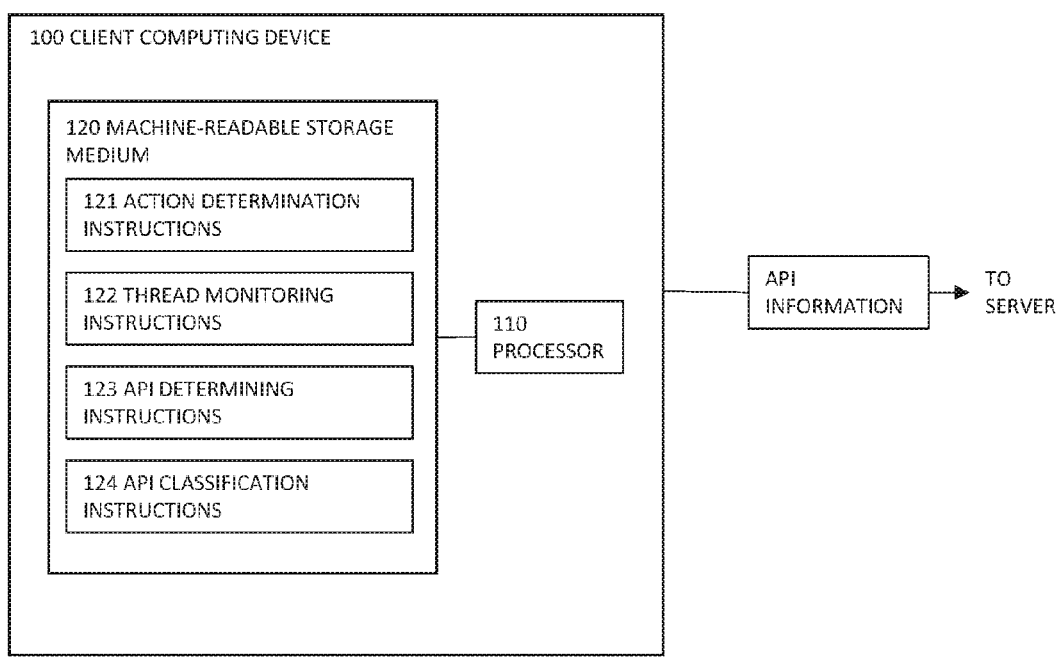
FIG. 1 is a block diagram of an example client computing device for determining user experience of an application running on the client computing device.

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

As detailed above, application owners, application developers, and other interested parties often want to analyze and improve user experience of their application. To that end, these parties often rely on client-side monitoring tools to collect data from an application at the client side and send that data to a server for analysis. A server may perform various analyses on the collected data to determine what collected data may affect user experience. The process to determine which of the collected data affects user experience and which parts of the application are associated with the pertinent collected data may be time consuming and may involve complicated processing Various client-side monitoring tools may collect all traffic and data being processed in relation to an application and pass the collected information to a server for analysis. The server may then sift through the collected information, analyze which portions of the collected information may be relevant to user experience, and provide information related to those relevant portions to application owner, application developers, and/or other interested parties. Those interested parties may then identify which processes or functionality of the application may produce the relevant portions of information and determine how to optimize the identified processes or functionality. The process may involve a lot of data being sent to and from the client and server, and complicated back-end processing.

Example embodiments disclosed herein address these issues by instrumenting an application running on a client device to determine that a first user action occurred and monitor a set of threads separate from an user interface (UI) thread of the computing device, where an individual thread of the set of threads processes an application programming interface (API) in response to the occurrence of the user action. The client computing device may classify the API as affecting user experience, being related to the user action that occurred, being unrelated to the user action, and/or with another classification describing the relation of the API to the user experience of the application. The client computing device may then tag the API with the corresponding classification, and send information related to the tagged API to a server which may analyze application data, make the application available to the client, and/or be otherwise related to the application being monitored.

The client computing device may classify an individual API by determining whether the individual API is related to the user action. Responsive to the individual API not being related to the user action, the client computing device may classify the individual API as not related to user action. Responsive to the individual API being related to the user action, the client computing device may then determine whether the individual API causes the UI thread of the computing device to be updated. Responsive to the UI thread being updated, the client computing device may classify the first API as affecting user experience. Responsive to the individual API not causing an update to the UI thread, the client computing device may classify the individual API as related to the user action.

Referring now to the drawings, FIG. 1 is a block diagram of an example client computing device 100 for determining user experience of an application running on the client computing device 100. Client computing device 100 may be any computing device accessible to a server computing device, such as server computing device 250 of FIG. 2, over the Internet. In the embodiment of FIG. 1, client computing device 100 includes a processor 110 and a non-transitory machine-readable storage medium 120.

Processor 110 may be one or more central processing units (CPUs), microprocessors, and/or other hardware devices suitable for retrieval and execution of instructions stored in machine-readable storage medium 120. Processor 110 may fetch, decode, and execute instructions 121, 122, 123, 124, and/or other instructions to enable monitoring of applications running on the client computing device 100, as described below. As an alternative or in addition to retrieving and executing instructions, processor 110 may include one or more electronic circuits comprising a number of electronic components for performing the functionality of one or more of instructions 121, 122, 123, 124, and/or other instructions.

In one example, the program instructions can be part of an installation package that can be executed by processor 120 to implement the functionality described herein. In this case, memory 120 may be a portable medium such as a CD, DVD, or flash drive or a memory maintained by another computing device (e.g., the server computing device 200) from which the installation package can be downloaded and installed. In another example, the program instructions may be part of an application or applications already installed on client computing device 100.

Machine-readable storage medium 120 may be any hardware storage device for maintaining data accessible to client computing device 100. For example, machine-readable storage medium 120 may include one or more hard disk drives, solid state drives, tape drives, and/or any other storage devices. The storage devices may be located in client computing device 100 and/or in another device in communication with cloud server 250. As detailed below, storage medium 120 may maintain and/or store the data and information described herein.

For example, machine-readable storage medium 120 may be any electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a storage drive, an optical disc, and the like.

As described in detail below, machine-readable storage medium 120 may be encoded with executable instructions for enabling client execution of the functionality described herein. For example, machine-readable storage medium 120 may store action determination instructions 121, thread monitoring instructions 122, API determining instructions 123, API classification instructions 124, and/or other instructions that may be used to carry out the functionality of the invention.

Action determination instructions 121, when executed by processor 110, may determine whether a user action was perceived in the application. Action determination instructions 121, when executed by processor 110, may determine that a user action occurred in the application, may receive an indication that a user action occurred in the application, and/or may otherwise determine that a user action was perceived in the application. For example, the action determination instructions 121, when executed by processor 110, may determine that a user action occurred in the application by monitoring a set of handlers in the application and/or the client computing device 100 via which user action may be initially processed. Examples of handlers include an OnClick handler, a ButtonPress handler, and/or other handlers that detect user interaction with the client computing device. In another example, the action determination instructions 121, when executed by processor 110, may receive an indication from the application, from the client computing device 100, from the server computing device 250, and/or from another source, that a user action occurred.

Responsive to determining that a user action occurred in the application, action determination instructions 121, when executed by processor 120, may trigger monitoring of threads, APIs, and/or other data or processing that may occur in the application. For example, responsive to determining that a user action occurred in the application, action determination instructions 121, when executed by processor 120, may trigger the execution of the thread monitoring instructions 122.

Thread monitoring instructions 122, when executed by processor 110, may monitor the threads running in the application. Thread monitoring instructions 122, when executed by processor 110, may monitor the threads running in the application responsive to the action determination instructions 121 determining that a user action occurred in the application. In some examples, thread monitoring instructions 122, when executed by processor 110, may continuously monitor threads running in the application, may monitor threads in the application regardless of whether the action determination instructions 121 determined that user action occurred, may monitor threads in the application at predetermined intervals, may monitor threads running in the application responsive to other criteria being met, and/or may monitor threads in other manners.

In conjunction with monitoring the threads running in the application, thread monitoring instructions 122, when executed by processor 110, may maintain, for each individual thread running in the application, an identifier of the individual thread, information related to the processing being done on the thread, and/or other information related to the individual thread. The information related to the processing being done on the thread may comprise, for example, information related to an API being executed on the thread, timestamps associated with when execution of an API begins and ends, inputs and/or outputs of the processing being performed on the thread, information related to interaction with other threads, information related to interaction with other computing devices, and/or other information related to the processing.

In some examples, a main user interface (UI) thread spawned by the application may be the only thread in the application with permission to update the user interface of the client computing device 100. In some of these examples, the client computing device 100 on which the application is running may be a mobile device, a thin client device, a device running on a virtual machine, and/or other computing device with limited processing capability.

The thread monitoring instructions 122, when executed by processor 110, may maintain information related to the UI thread, including an indicator that the UI thread has permission to update the user interface of client computing device 100, inputs received to the UI thread to update the user interface of client computing device 100, the source of those inputs, information related to the processing that caused the source to provide an input to the UI thread, and/or other information related to the UI thread. In some examples, along with the UI thread, numerous other threads (e.g., background threads) may be spawned by the application in response to processing performed by the application, user input received via the application, instructions received via the application, and/or other interaction or functionality of the application. The thread monitoring instructions 122, when executed by processor 110, may maintain information related to these numerous other threads as well.

The thread monitoring instructions 122, when executed by processor 110, may store the information related to monitoring the threads running in the application in a non-transitory machine-readable storage medium 120 of the client computing device 100. The thread monitoring instructions 122, when executed by processor 110, may send the monitoring information to the server computing device 250 as an alternative or in conjunction with storing the monitoring information locally on the client computing device 100. In some examples, the thread monitoring instructions 122, when executed by processor 110, may send the monitoring information to the server computing device 250 at predetermined intervals, upon completion of processing associated with a received user action, in response to a request received from server computing device 250, and/or based upon another set of conditions being met.

The API determining instructions 123, when executed by processor 110, may determine whether an individual API affects user experience of the application. For example, the API determining instructions 123, when executed by processor 110, may first determine whether an individual API is related to the user action. Responsive to determining that the individual API is related to the user action, the API determining instructions 123, when executed by processor 110, may determine whether the thread on which the individual API causes an update to the UI thread of the client computing device 100. For example, the API determining instructions 123, when executed by processor 110, may determine whether the thread on which the individual API is processed caused the UI thread to be updated responsive to completion of the processing of the individual API.

The API determining instructions 123, when executed by processor 110, may update monitoring information responsive to these determinations. For example, responsive to determining that the thread causes an update to the UI thread of the client computing device, the API determining instructions 123, when executed by processor 110 may update the monitoring information maintained by the thread monitoring instructions 122 to indicate that the individual API was related to user action and caused an update to the main UI thread. Responsive to determining that the thread did not cause an update to the UI thread, the API determining instructions 123, when executed by processor 110, may update the monitoring information to indicate that the individual API was related to user action but did not cause the UI thread to be updated. Responsive to determining that the individual API is not related to user action, the API determining instructions 123, when executed by processor 110, may update the monitoring information to indicate that the individual API was not related to user action.

The API determining instructions 123, when executed by processor 110, may determine whether an individual API is related to user action by determining whether the individual API is related to processing that occurs responsive to the action determination instructions 121 determining that a user action occurred. For example, the API determining instructions 123, when executed by processor 110, may determine whether an individual API was executed in response to the user action occurring, in response to an individual API related to the user action causing the API to execute, and/or otherwise being related to the user action.

The API determining instructions 123, when executed by processor 110, may determine whether the individual API was executed directly in response to the user action occurring. Responsive to determining that the individual API was executed directly in response to the user action occurring, the API determining instructions 123, when executed by processor 110, may update the monitoring information associated with the individual API to indicate the API is related to the user action.

Responsive to determining that the individual API was not executed directly in response to the user action occurring, the API determining instructions 123, when executed by processor 110, may determine whether the individual API was executed directly in response to an API related to the user action being executed.

Responsive to determining that the API was executed directly in response to an API related to the user action being executed, the API determining instructions 123, when executed by processor 110, may update the monitoring information associated with the individual API to indicate the API is related to the user action. Responsive to determining that the individual API was not directly executed in response to an API related to the user action being processed, the API determining instructions 123, when executed by processor 110, may update the monitoring information associated with the individual API to indicate the API is not related to the user action.

In some examples, the API determining instructions 123, when executed by processor 110, may maintain a list of all APIs that are processed in response to the action determination instructions 121 determining that a user action occurred. The API determining instructions 123, when executed by processor 110, may include any APIs in the list that were in the middle of being processed on one of the set of threads monitored by the thread monitoring instructions 122, may include any APIs that began processing on one of the set of threads, and/or may include other APIs that begin processing or are being processed after determining that the user action occurred. In some examples, the API determining instructions 123, when executed by processor 110, may only include in the list those APIs that began processing after determining that the user action occurred. The API determining instructions 123, when executed by processor 110, may continue to include APIs in the list until determining that processing associated with the user action has completed, determining that all updates to the user interface of the client computing device 100 in response to the user action have been completed, determining that another user action has been determined, and/or based on another set of conditions being met.

For each individual API in the list of APIs, the API determining instructions 123, when executed by processor 110, may maintain an identifier of the API, an identifier of the thread on which the API is being processed, an identifier of a user action that was determined to have occurred (e.g., the user action that occurred immediately prior to the call of the API), information related to the processing performed via the API, inputs and/or outputs to the API, an indication of whether the API caused the UI thread to be updated, information related to interaction with other APIs, other threads, other devices, and/or other entities, information related to the source of the API (e.g., information related to what prompted or called the API to be processed), a timestamp associated with the beginning and end of the API processing, information related to the association of the API with the user action, and/or other information related to the API.

The information related to the association of the API with the user action may comprise, for example, information related to whether the user action prompted (either directly or indirectly) the call of the API, whether the API is otherwise related to the user action, whether the API is unrelated to the user action, and/or other information related to a relationship between the API and the user action.

The API determining instructions 123, when executed by processor 110, may continue to update the information maintained with the APIs in the list as processing associated with the user action continues. For example, the API determining instructions 123, when executed by processor 110, may update the information related to the association of the API with the user action to include an indication that the API caused an update to be sent to the UI thread (to then update the user interface of the client computing device 100). In another example, the API determining instructions 123, when executed by processor 110, may update the information related to the timestamp associated with the end of processing of the API. Other updates to the information related to the API may be performed as well.

As mentioned above, the API determining instructions 123, when executed by processor 110, may continue to update the list of APIs with new APIs that begin processing after determining that the user action occurred, until one of a set of conditions is met. The set of conditions may comprise, for example, that processing associated with the user action is complete, all updates to the user interface of the client computing device 100 in response to the user action have finished, all updates to the UI thread in response to the user action occurring have been completed, and/or other conditions based on which to stop tracking APIs associated with a particular user action.

The API determining instructions 123, when executed by processor 110, may determine that processing responsive to the user action is complete (or updating of the UI of the client computing device 100 responsive to the user action is complete) by receiving an indication from the application, the client computing device 100, the server computing device 250, and/or another source. In another example, the API determining instructions 123, when executed by processor 110, may determine that processing responsive to the user action is complete by comparing the processing associated with the user action to the processing that has been performed responsive to the user action occurring. Similarly, the API determining instructions 123, when executed by processor 110, may determine that updating of the UI of the client computing device 100 responsive to the user action is complete by comparing the UI updates associated with the user action to the UI updates that have been performed responsive to the user action occurring. The processing and/or UI updates associated with the user action may be stored in a non-transitory machine-readable storage medium 120 of the client computing device 100, may be received from the server computing device 250, and/or may be otherwise determined.

Based on the monitored information maintained by the application, the thread monitoring instructions 122, and/or the API determining instructions 123, the API classification instructions 124, when executed by processor 110, may classify the monitored APIs. The API classification instructions 124, when executed by processor 110, may classify the monitored APIs as one of several classifications related to user experience. The classifications may be predetermined, may be made available with the availability of the application to the client computing device 100, may be downloaded by the client computing device 100 responsive to the launch of a new session of the application on the client computing device 100, may be pushed by a server computing device 250 that may make the application available to the client computing device 100, and/or be otherwise determined. In some examples, the API classification instructions 124, when executed by processor 110, may tag an API with the determined classification. For example, the tags may indicate that an API affects user experience, is related to a user action, is unrelated to a user action, and/or other indication of a relationship between the API and the application.

The API classification instructions 124, when executed by processor 110, may classify an individual API responsive to that API being monitored. In some examples, the API classification instructions 124, when executed by processor 110, may classify some or all of the APIs monitored by the thread monitoring instructions 122 and the API determining instructions 123 responsive to a set of conditions being met. The set of conditions may comprise, for example, processing responsive to the user action being completed, the updating of the UI responsive to the user action being complete, and/or other conditions related to the user action.

The API classification instructions 124, when executed by processor 110, may classify the APIs responsive to processing and/or UI updates being completed in order to allow the full processing of the APIs spawned responsive to the user action occurring in the application. By allowing the full processing of these APIs, the API classification instructions 124 can determine which APIs affect user experience, which APIs were merely related to the user action, which APIs were not related to the user action, and/or other classes of APIs.

For example, the API classification instructions 124, when executed by processor 110, may determine that an individual API affected user experience responsive to the API causing the UI thread of the client computing device 100 to be updated. The API classification instructions 124 may determine that the individual API caused the UI thread to be updated responsive to analyzing the monitoring information associated with that individual API.

In another example, the API classification instructions 124, when executed by processor 110, may determine that an individual API did not affect user experience, but was related to the user action, responsive to the monitoring information related to that API indicating that the API did not cause any update to the UI thread of the client computing device 100 but that the API was executed responsive to the user action occurring.

In another example, the API classification instructions 124, when executed by processor 110, may determine that an individual API did not affect user experience, and was not related to the user action, responsive to the monitoring information related to that API indicating that the API did not cause any update to the UI thread of the client computing device 100 and that the API was not executed in response to the user action occurring or in any other way related to the user action occurring.

As discussed above, responsive to each of the APIs monitored being classified, the API classification instructions 124, when executed by processor 110, may tag the APIs with the corresponding classification and may then update the monitoring information to include information related to the tags associated with the individual APIs. The API classification instructions 124, when executed by processor 110, may send the updated monitoring information to the server computing device 250, may make the monitoring information available for download via the application, and/or may otherwise make the updated monitoring information available to application developers, application owners, and/or other interested parties.

In some examples, the API classification instructions 124, when executed by processor 110, may flush the updated monitoring information responsive to sending the updated monitoring information to the server computing device 250. For example, the API classification instructions 124, when executed by processor 110, may delete the monitoring information related to APIs related to a user action for which the monitoring information was already sent to the server computing device 250. The API classification instructions 124, when executed by processor 110, may still maintain monitoring information for APIs not related to that user action or for which monitoring information has not yet been made available. The API classification instructions 124, when executed by processor 110, may flush the monitoring information for other reasons and/or in other manners as well.

The classifications and/or tags associated with an API may be used by application developers, application owners, and/or other interested parties to determine which APIs to optimize as the application is revised and tweaked. By knowing in particular which APIs affect user experience, the application can be revised to optimize those APIs that affect user experience.

Figure 2:
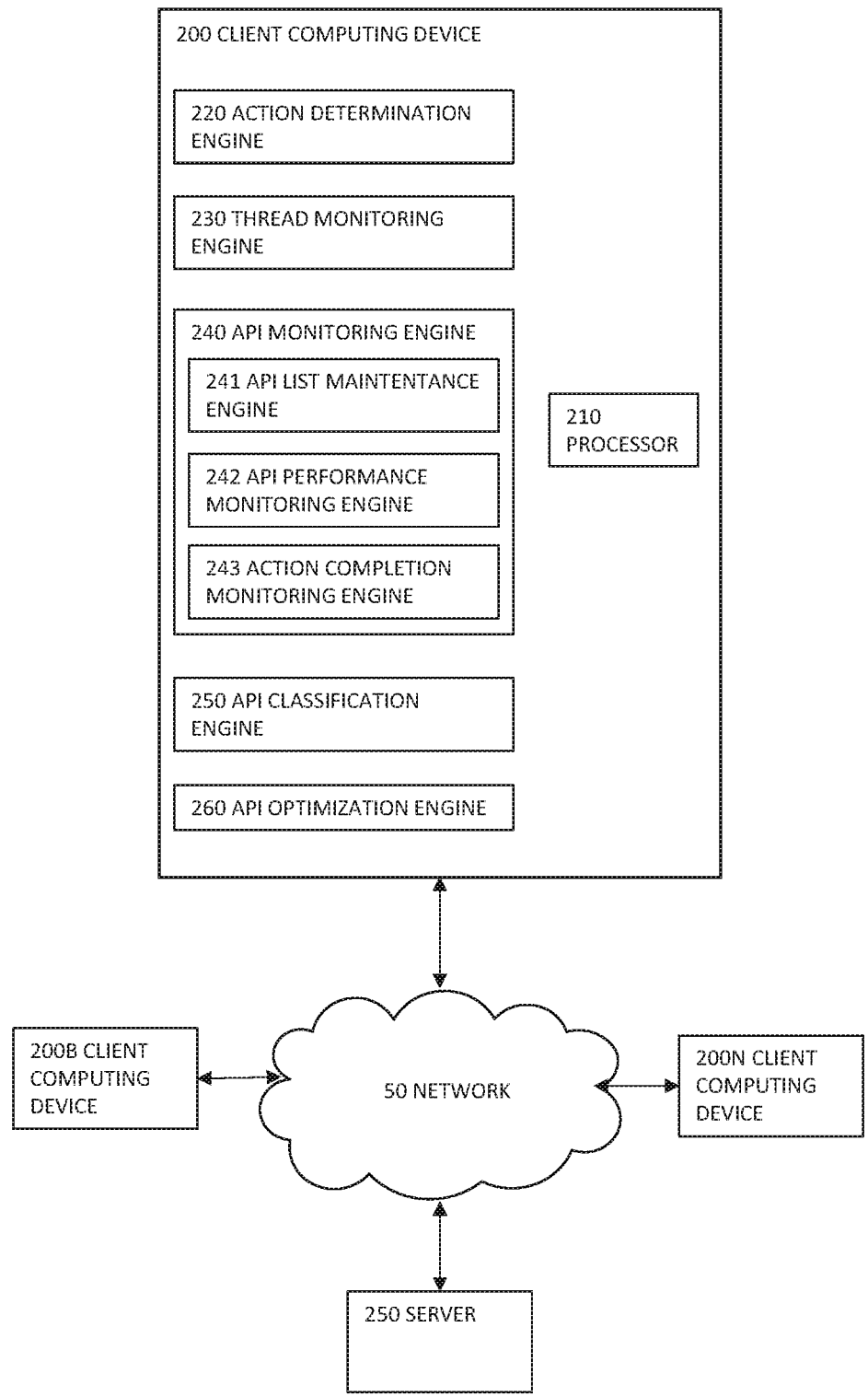
FIG. 2 is a block diagram of an example server computing device in communication with a plurality of client computing devices for determining user experience of an application running on the plurality of client computing devices.

FIG. 2 is a block diagram of an example server computing device 250 in communication with a plurality of client computing devices 200, 200B, . . . , 200N for determining user experience of an application running on the plurality of client computing devices. As with processor 110 of FIG. 1, processor 210 may be one or more CPUs, microprocessors, and/or other hardware devices suitable for retrieval and execution of instructions.

As illustrated in FIG. 2 and described below, server computing device 250 may communicate with client computing device 200. As with client computing device 100 of FIG. 1, client computing device 200 may be a notebook, desktop, tablet, workstation, mobile device, or any other device suitable for executing the functionality described below.

As detailed below, client 200 may include a series of engines 220-260 for enabling a user to monitor applications. Each of the engines may generally represent any combination of hardware and programming. For example, each of the engines may include a series of program instructions encoded on a machine-readable storage medium and executable by a processor 110 of the client computing device 100. In addition or as an alternative, each engine may include one or more hardware devices including electronic circuitry for implementing the functionality described below.

Action determination engine 220 may determine whether a user action was perceived in the application. Action determination engine 220 may determine that a user action occurred in the application, may receive an indication that a user action occurred in the application, and/or may otherwise determine that a user action was perceived in the application. Further details regarding an example implementation of action determination engine 220 are provided above in connection with action determination instructions 121 of FIG. 1.

Thread monitoring engine 230 may monitor the threads running in the application. Thread monitoring engine 230 may monitor the threads running in the application responsive to the action determination engine 220 determining that a user action occurred in the application. Further details regarding an example implementation of thread monitoring engine 230 are provided above in connection with thread monitoring instructions 122 of FIG. 1.

API monitoring engine 240 may determine whether an individual API affects user experience of the application. For example, the API monitoring engine 240 may determine whether an individual API processed on a background thread causes an update to the UI thread of the client computing device 100. Responsive to determining that an individual API causes an update to the UI thread of the client computing device, the API monitoring engine 240 may update the monitoring information maintained by the thread monitoring engine 230. Further details regarding an example implementation of API monitoring engine 240 are provided above in connection with API determining instructions 123 of FIG. 1.

In some examples, and as depicted in FIG. 2, API monitoring engine 240 may comprise a set of engines, including, for example, API list maintenance engine 241, API performance monitoring engine 242, action completion monitoring engine 243, and/or other engines to monitor APIs being processed in conjunction with the application.

API list maintenance engine 241 may maintain a list of all APIs that are processed in response to the action determination instructions 121 determining that a user action occurred. The API list maintenance engine 241 may include in the list any APIs that were in the middle of being processed on one of the set of threads monitored by the thread monitoring instructions 122, may include any APIs that began processing on one of the set of threads, and/or may include other APIs that begin processing or are being processed after determining that the user action occurred. Further details regarding an example implementation of API list maintenance engine 241 are provided above in connection with API determining instructions 123 of FIG. 1.

API performance monitoring engine 242 may monitor the APIs included in the list of APIs, may add new APIs that begin processing after determining that the user action occurred, and/or may otherwise monitor APIs being processed after the user action occurred. For example, the API determining instructions 123, when executed by processor 110, may update the information related to the association of the API with the user action to include an indication that the API caused an update to be sent to the UI thread (to then update the user interface of the client computing device 100). In another example, the API determining instructions 123, when executed by processor 110, may update the information related to the timestamp associated with the end of processing of the API. Further details regarding an example implementation of API performance monitoring engine 242 are provided above in connection with API determining instructions 123 of FIG. 1.

Action completion engine 243 may determine that processing responsive to the user action is complete (or updating of the UI of the client computing device 100 responsive to the user action is complete) by receiving an indication from the application, the client computing device 100, the server computing device 250, and/or another source. In another example, the API determining instructions 123, when executed by processor 110, may determine that processing responsive to the user action is complete by comparing the processing associated with the user action to the processing that has been performed responsive to the user action occurring. Similarly, the API determining instructions 123, when executed by processor 110, may determine that updating of the UI of the client computing device 100 responsive to the user action is complete by comparing the UI updates associated with the user action to the UI updates that have been performed responsive to the user action occurring. Further details regarding an example implementation of action completion engine 243 are provided above in connection with API determining instructions 123 of FIG. 1.

API classification engine 250 may classify the monitored APIs. Further details regarding an example implementation of API classification engine 250 are provided above in connection with API classification instructions 124 of FIG. 1.

API optimization engine 260 may optimize APIs that are tagged as affecting user experience. In some examples, API optimization engine 260 may provide an indication that an API is tagged as affecting user experience and/or otherwise provide information about that API to application owners, application developers, and/or other interested parties. For example, the API optimization engine 260 may send periodic reports to interested parties regarding APIs that were newly tagged as affecting user experience, a change of tag of an API from affecting user experience to another classification, and/or other information related to the tagged APIs.

Figure 3:
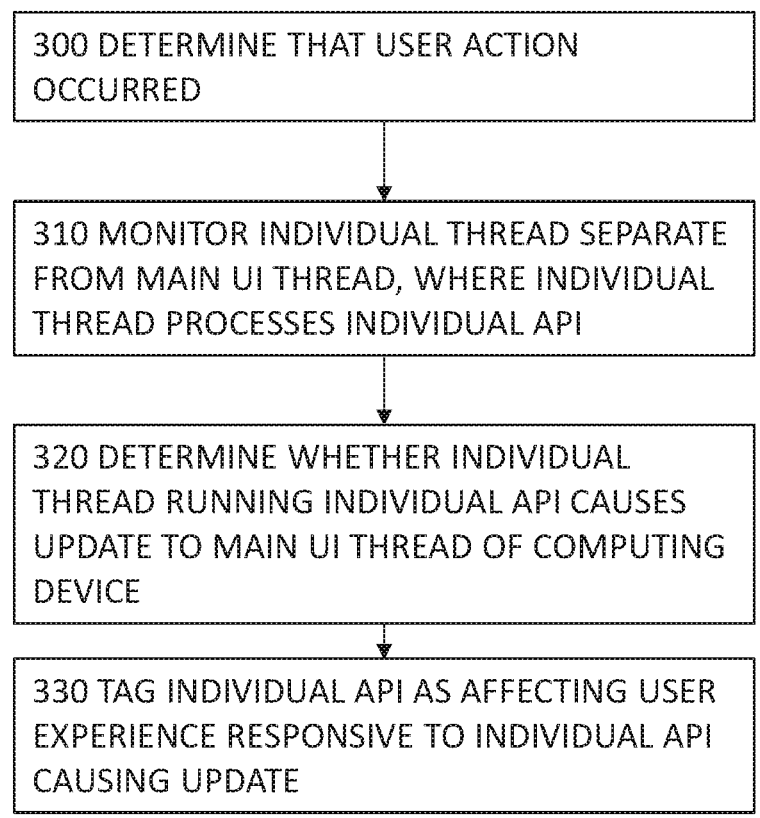
FIG. 3 is a flowchart of an example method for execution by a client computing device for determining user experience of an application running on the client device.
Figure 3A:
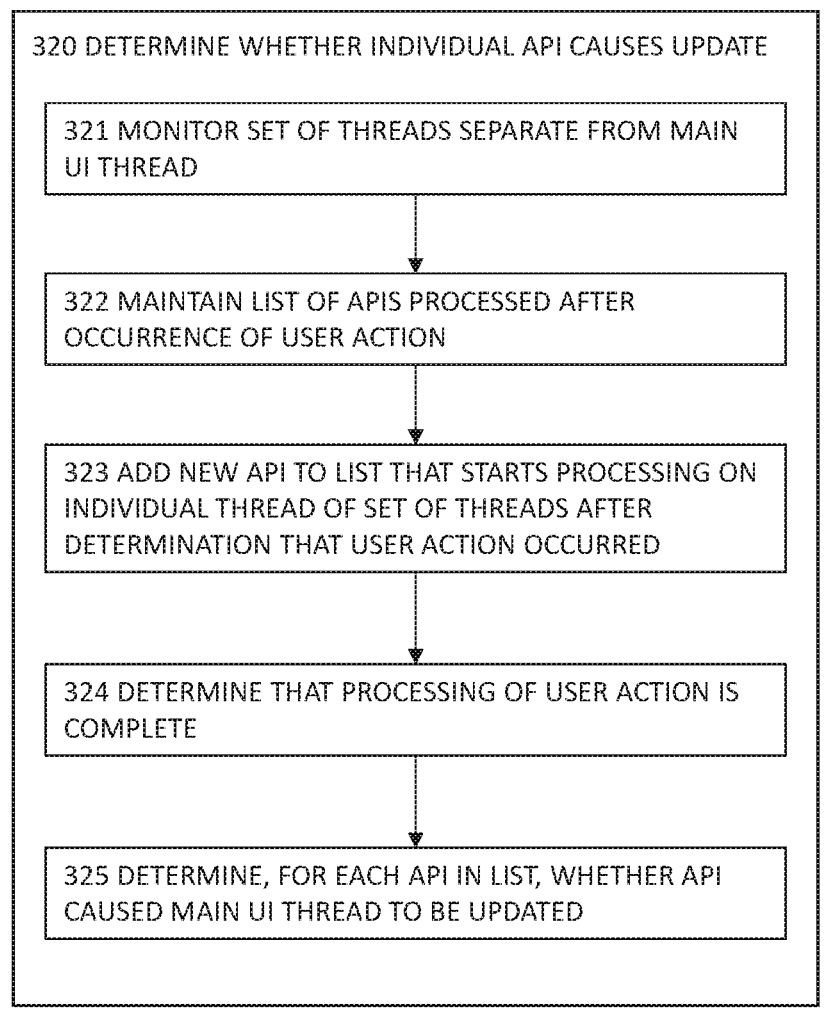
FIG. 3A is a flowchart of an example method for execution by a client computing device for determining whether an individual API executed by an application running on the client computing device causes an update.

FIG. 3 is a flowchart of an example method for execution by a client computing device for determining user experience of an application running on the client device. FIG. 3A is a flowchart of an example method for execution by a client computing device for determining whether an individual API executed by an application running on the client computing device causes an update.

Although execution of the method described below is with reference to client computing device 100 and/or client computing device 200, other suitable devices for execution of this method will be apparent to those of skill in the art, such as server computing device 250. The method described in FIG. 3 and other figures may be implemented in the form of executable instructions stored on a machine-readable storage medium, such as storage medium 120, and/or in the form of electronic circuitry.

In an operation 300, a determination may be made that user action occurred. For example, the client computing device 100 (and/or the action determination instructions 121, the action determination engine 220, or other resource of the client computing device 100) may determine that a user action occurred. The client computing device 100 may determine that a user action occurred in a manner similar or the same as that described above in relation to the execution of the action determination instructions 121, the action determination engine 220, and/or other resource of the client computing device 100.

In an operation 310, an individual thread separate from the main UI thread of the client computing device 100 may be monitored, where that individual thread processes an individual API. For example, the client computing device 100 (and/or the thread monitoring instructions 122, the thread monitoring engine 230, or other resource of the client computing device 100) may monitor the individual thread. The client computing device 100 may monitor the individual thread in a manner similar or the same as that described above in relation to the execution of the thread monitoring instructions 122, the thread monitoring engine 230, and/or other resource of the client computing device 100.

In an operation 320, a determination may be made as to whether that individual API monitored in operation 310 causes an updated to the main UI thread of the client computing device 100. For example, the client computing device 100 (and/or the API determining instructions 123, the API monitoring engine 240, or other resource of the client computing device 100) may determine whether the individual API caused an update to the main UI thread. The client computing device 100 may determine whether the individual API caused an update to the main UI thread in a manner similar or the same as that described above in relation to the execution of the API determining instructions 123, the API monitoring engine 2400, and/or other resource of the client computing device 100.

In some examples, the determination of whether the individual API causes an update to the main UI thread of the client computing device may comprise various operations. For example, as depicted in FIG. 3A, in an operation 321, a set of threads separate from the main UI thread of the client computing device 100 may be monitored. For example, the client computing device 100 (and/or the thread monitoring instructions 121, the thread monitoring engine 230, or other resource of the client computing device 100) may monitor the set of threads. The client computing device 100 may monitor the set of threads in a manner similar or the same as that described above in relation to the execution of the thread monitoring instructions 121, the thread monitoring engine 230, and/or other resource of the client computing device 100.

In an operation 322, a list of APIs processed after determining that the user action occurred may be maintained. For example, the client computing device 100 (and/or the API determining instructions 123, the API monitoring engine 240, or other resource of the client computing device 100) may maintain the list of APIs. The client computing device 100 may maintain the list of APIs in a manner similar or the same as that described above in relation to the execution of API determining instructions 123, the API monitoring engine 240, and/or other resource of the client computing device 100.

In an operation 323, a new API may be added to the list of APIs, where the new API starts processing on an individual thread of the set of threads after the determination that the user action occurred. For example, the client computing device 100 (and/or the API determining instructions 123, the API monitoring engine 240, or other resource of the client computing device 100) may add the new API. The client computing device 100 may add the new API in a manner similar or the same as that described above in relation to the execution of the API determining instructions 123, the API monitoring engine 240, and/or other resource of the client computing device 100.

In an operation 324, a determination may be made that processing associated with the user action has completed. For example, the determination may be made that all processing associated with the user action has completed. In another example, the determination may be made that all updates to the user interface in response to the user action has been completed. Other determinations related to the completion of processing associated with the user action may also be made. For example, the client computing device 100 (and/or the API determining instructions 123, the API monitoring engine 240, or other resource of the client computing device 100) may determine that the processing is completed. The client computing device 100 may determine that the processing is completed in a manner similar or the same as that described above in relation to the execution of the API determining instructions 123, the API monitoring engine 240, and/or other resource of the client computing device 100.

In an operation 325, a determination may be made, for each API in the list of APIS, regarding whether the individual thread running each individual API causes the main UI thread to be updated. For example, the client computing device 100 (and/or the API determining instructions 123, the API monitoring engine 240, or other resource of the client computing device 100) may determine whether an individual thread running an API caused the main UI thread to be updated responsive to the processing of the individual API being complete. The client computing device 100 may determine whether each of the APIs in the list caused the main UI thread to be updated in a manner similar or the same as that described above in relation to the execution of the API determining instructions 123, the API monitoring engine 240, and/or other resource of the client computing device 100.

Returning to FIG. 3, in an operation 330, the individual API may be tagged as affecting user experience responsive to the determination that the individual API causes an update to the main UI thread of the client computing device 100. For example, the client computing device 100 (and/or the API classification instructions 124, the API classification engine 250, or other resource of the client computing device 100) may tag the API as affecting user experience. The client computing device 100 may tag the API as affecting user experience in a manner similar or the same as that described above in relation to the execution of the API classification instructions 124, the API classification engine 250, and/or other resource of the client computing device 100.

Figure 4:
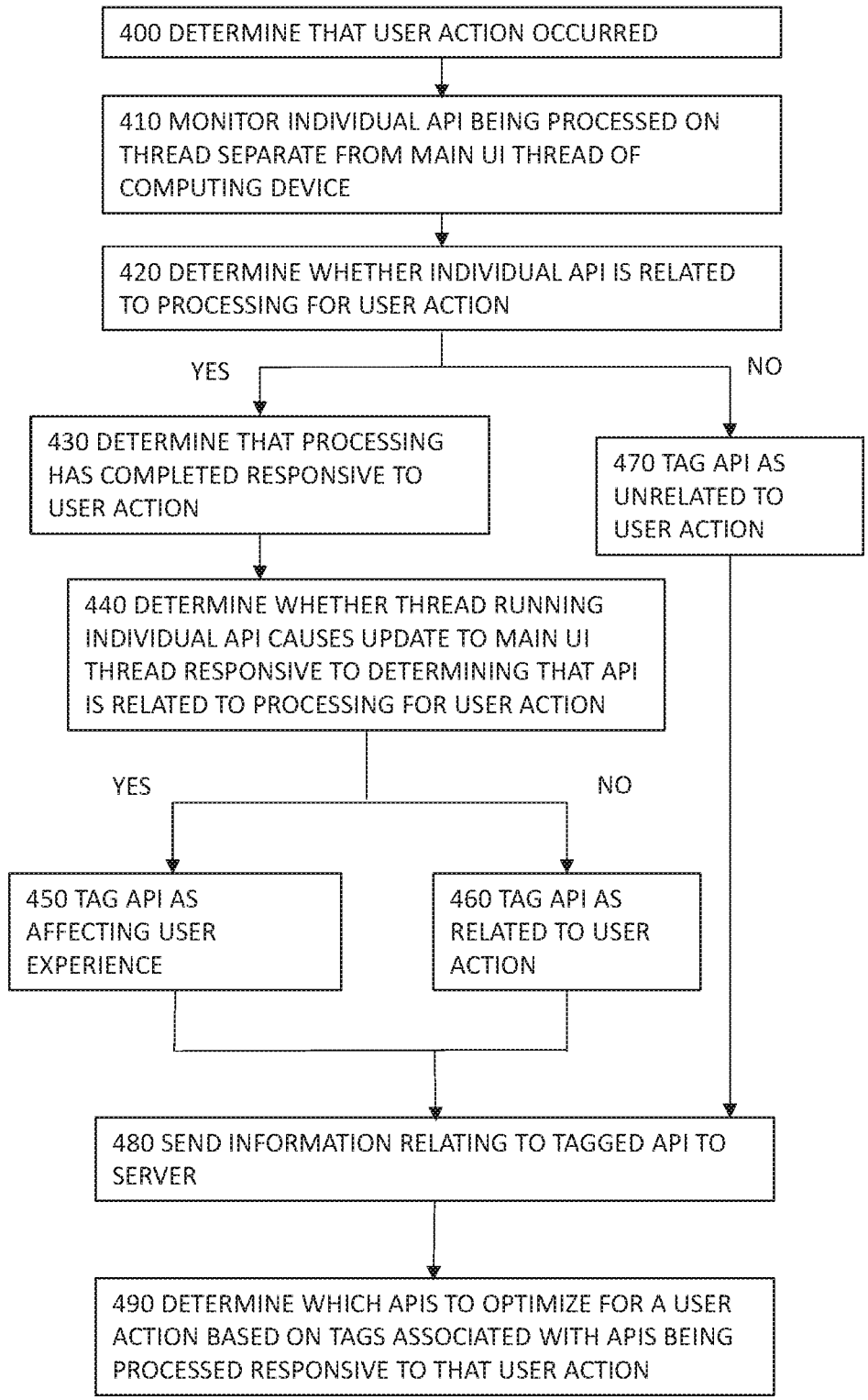
FIG. 4 is a flowchart of an example method for execution by a client computing device for determining user experience of an application running on the client device.
Figure 5:
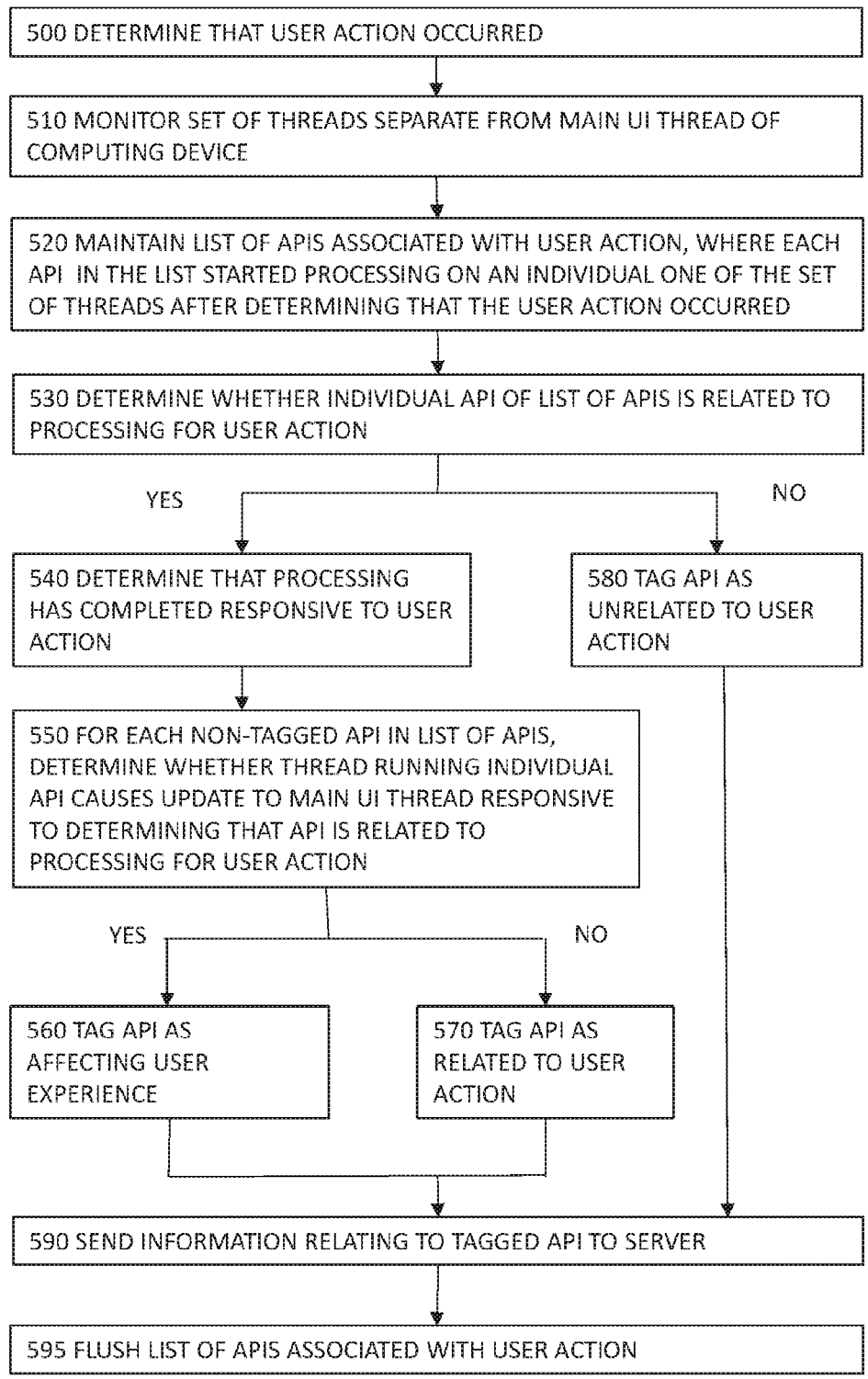
FIG. 5 is a flowchart of an example method for execution by a client computing device for determining user experience of an application running on the client device.

FIGS. 4 and 5 depict flowcharts of example methods for execution by a client computing device 100 for determining user experience of an application running on the client computing device 100. FIG. 4 may focus on an individual API being monitored, whereas FIG. 5 may focus on the plurality of threads and APIs that may be processed after occurrence of a user action has been determined.

In an operation 400, a determination may be made that user action occurred. For example, the client computing device 100 (and/or the action determination instructions 121, the action determination engine 220, or other resource of the client computing device 100) may determine that a user action occurred. The client computing device 100 may determine that a user action occurred in a manner similar or the same as that described above in relation to the execution of the action determination instructions 121, the action determination engine 220, and/or other resource of the client computing device 100.

In an operation 410, an individual thread separate from the main UI thread of the client computing device 100 may be monitored, where that individual thread processes an individual API. For example, the client computing device 100 (and/or the thread monitoring instructions 122, the thread monitoring engine 230, or other resource of the client computing device 100) may monitor the thread. The client computing device 100 may monitor the thread in a manner similar or the same as that described above in relation to the execution of the thread monitoring instructions 122, the thread monitoring engine 230, and/or other resource of the client computing device 100.

In an operation 420, a determination may be made as to whether that individual API is related to processing being performed responsive to the user action occurring. For example, the client computing device 100 (and/or the API determining instructions 123, the API monitoring engine 240, or other resource of the client computing device 100) may determine whether an API is related to the processing. The client computing device 100 may determine whether an API is related to the processing in a manner similar or the same as that described above in relation to the execution of the API determining instructions 123, the API monitoring engine 240, and/or other resource of the client computing device 100.

Responsive to the individual API being related to processing for the user action, in an operation 430, a determination may be made as to whether processing has completed responsive to the user action. For example, the determination may be made that all processing associated with the user action has completed. In another example, the determination may be made that all updates to the user interface in response to the user action has been completed. Other determinations related to the completion of processing associated with the user action may also be made. For example, the client computing device 100 (and/or the API determining instructions 123, the API monitoring engine 240, or other resource of the client computing device 100) may determine that the processing is completed. The client computing device 100 may determine that the processing is completed in a manner similar or the same as that described above in relation to the execution of the API determining instructions 123, the API monitoring engine 240, and/or other resource of the client computing device 100.

Responsive to processing being completed for the user action, in an operation 440, a determination may be made as to whether the individual thread executing the individual API causes an update to the main UI thread. For example, the client computing device 100 (and/or the API determining instructions 123, the API monitoring engine 240, or other resource of the client computing device 100) may determine whether each of the APIs in the list caused the main UI thread to be updated. The client computing device 100 may determine whether each of the APIs in the list caused the main UI thread to be updated in a manner similar or the same as that described above in relation to the execution of the API determining instructions 123, the API monitoring engine 240, and/or other resource of the client computing device 100.

Responsive to determining that the individual thread executing the individual API causes an update to the main UI thread after completion of the processing of the individual API, in an operation 450, the API may be tagged as affecting user experience. For example, the client computing device 100 (and/or the API classification instructions 124, the API classification engine 250, or other resource of the client computing device 100) may tag the API as affecting user experience. The client computing device 100 may tag the API as affecting user experience in a manner similar or the same as that described above in relation to the execution of the API classification instructions 124, the API classification engine 250, and/or other resource of the client computing device 100.

Responsive to determining that the individual API does not cause an update to the main UI thread, in an operation 460, the API may be tagged as related to user action. For example, the client computing device 100 (and/or the API classification instructions 124, the API classification engine 250, or other resource of the client computing device 100) may tag the API as related to the user action. The client computing device 100 may tag the API as related to the user action in a manner similar or the same as that described above in relation to the execution of the API classification instructions 124, the API classification engine 250, and/or other resource of the client computing device 100.

Returning to the determination of operation 420, responsive to determining that the API is not related to processing for the user action, the API may be tagged as unrelated to user action in an operation 470. For example, the client computing device 100 (and/or the API classification instructions 124, the API classification engine 250, or other resource of the client computing device 100) may tag the API as unrelated to the user action. The client computing device 100 may tag the API as unrelated to the user action in a manner similar or the same as that described above in relation to the execution of the API classification instructions 124, the API classification engine 250, and/or other resource of the client computing device 100.

The information related to the tagged API may be sent to the server computing device 250 in an operation 480. For example, the client computing device 100 (and/or the API classification instructions 124, the API classification engine 250, or other resource of the client computing device 100)

may send the tagged API to the server computing device 250. The client computing device 100 may send the tagged API in a manner similar or the same as that described above in relation to the execution of the API classification instructions 124, the API classification engine 250, and/or other resource of the client computing device 100.

In an operation 490, a determination may be made as to which APIs to optimize for a user action based on the tags associated with the APIs being processed responsive to that user action. For example, the client computing device 100 (and/or the API optimization engine 260, or other resource of the client computing device 100) may determine which APIs to optimize. The client computing device 100 may determine which APIs to optimize in a manner similar or the same as that described above in relation to the API optimization engine 260, and/or other resource of the client computing device 100.

Figure 6:
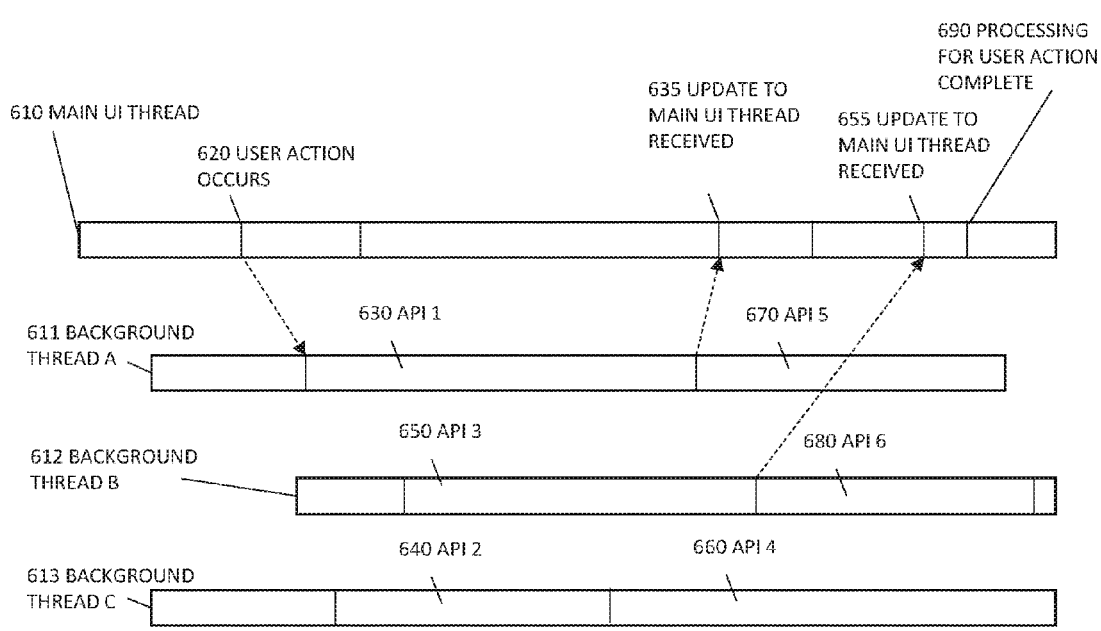
FIG. 6 is a block diagram of APIs that may be executed in an application running on the client computing device.

As mentioned above, FIG. 5 is a flowchart of an example method for execution by a client computing device for determining user experience of an application running on the client device. FIG. 6 is a block diagram of APIs that may be executed in an application running on the client computing device. FIGS. 7A and 7B each depict an exemplary table depicting information related to APIs that may be executed in an application running on a client computing device. The method described in FIG. 5 may be described in conjunction with the block diagram of APIs depicted in FIG. 6 and the tables depicted in FIGS. 7A-7B.

In an operation 500, a determination may be made that user action occurred. For example, the client computing device 100 (and/or the action determination instructions 121, the action determination engine 220, or other resource of the client computing device 100) may determine that a user action occurred. The client computing device 100 may determine that a user action occurred in a manner similar or the same as that described above in relation to the execution of the action determination instructions 121, the action determination engine 220, and/or other resource of the client computing device 100.

As shown in FIG. 6, the occurrence of a user action may be detected 620 on a main UI thread 610. The processing performed responsive to the occurrence of the user action may occur via one or more of a set of background threads (e.g., background thread A 611, background thread B 612, background thread C 613, and/or other threads). As mentioned above, the background threads may not have the ability to update the user interface of the client computing device 100 in some examples.

In some examples, the occurrence of the user action may result in API 1 630 being processed, which in turn may result in API 3 650, API 4 660 and API 6 680 being processed. As shown in FIG. 6, API 1 630 and API 5 670 may be processed via background thread A 611, API 3 650 and API 6 680 may be processed via background thread B 612, and API 4 660 may be processed via background thread C 612. Other APIs (e.g., API 2 640; API 5 670) may begin processing on the background threads after the occurrence of the user action; but may be unrelated to the user action. As shown in FIG. 6, API 2 640 may be processed via background thread C 613 and API 5 670 may be processed via background thread A 611. The threads pictured in FIG. 6 are exemplary in nature only; other threads and APIs may also perform processing during the processing of the user action. For example; other background threads may process other APIs. In some examples; after the processing of the user action detected at 620 is finished, another user action may be detected, with other APIs (e.g., APIs 7; 8, and/or other APIs) processed via the background threads.

Returning to FIG. 5, in an operation 510, the set of threads 610; 611, 612, 613 of the client computing device 100 may be monitored. For example, the client computing device 100 (and/or the thread monitoring instructions 121, the thread monitoring engine 230, or other resource of the client computing device 100) may monitor the set of threads. The client computing device 100 may monitor the set of threads 610, 611, 612, 613 in a manner similar or the same as that described above in relation to the execution of the thread monitoring instructions 121, the thread monitoring engine 230; and/or other resource of the client computing device 100.

In an operation 520, a list of APIs associated with the user action may be maintained. In some examples, each API (e.g., API 1 630, API 2 640, API 3 650; API 4 660, API 5 670; API 6, and/or other APIs) in the list started processing on an individual one of the set of monitored threads after determining that the user action occurred. For example, the client computing device 100 (and/or the API determining instructions 123, the API monitoring engine 240, or other resource of the client computing device 100) may maintain the list of APIs. The client computing device 100 may maintain the list of APIs in a manner similar or the same as that described above in relation to the execution of API determining instructions 123, the API monitoring engine 240, and/or other resource of the client computing device 100.

FIG. 7A depicts an exemplary table depicting information related to APIs that may be executed in an application running on a client computing device. For example, FIG. 7A may depict the list of APIs maintained by the client computing device 100. In the example depicted in FIG. 7A, the exemplary table may comprise information related to the user action detected at 610, as well as a subsequent user action that may be detected after the occurrence of the user action detected at 620. For example, the subsequent user action may result in APIs 7 and 8 being processed, where both API 7 and API 8 may be related to the subsequent user action, but only API 7 may update the main UI thread. In some examples, the occurrence of the subsequent user action may occur before processing associated with the user action detected at 620 is complete.

As shown in FIG. 7A, the information related to each API may include, for example, an identifier of a detected user action, an API identifier, a thread identifier via which the individual API may be processed, an indicator of whether the API is related to the user action, an indicator of whether the API updates the main UI thread, and/or other information related to the API. In some examples, the tag associated with the API may also be included.

Returning to FIG. 5, in an operation 530, a determination may be made as to whether an individual API of the list of APIs is related to processing for the user action. For example, the client computing device 100 (and/or the API determining instructions 123, the API monitoring engine 240, or other resource of the client computing device 100) may determine whether an API is related to the processing. The client computing device 100 may determine whether an API is related to the processing in a manner similar or the same as that described above in relation to the execution of the API determining instructions 123, the API monitoring engine 240, and/or other resource of the client computing device 100. In some examples, responsive to the determination, the information related to the API may be updated. In particular, the indicator of whether the API is related to user action may be updated.

Responsive to the individual API being related to processing for the user action, in an operation 540, a determination may be made as to whether processing has completed for the user action. For example, the client computing device 100 (and/or the API determining instructions 123, the API monitoring engine 240, or other resource of the client computing device 100) may determine that the processing is completed. The client computing device 100 may determine that the processing is completed in a manner similar or the same as that described above in relation to the execution of the API determining instructions 123, the API monitoring engine 240, and/or other resource of the client computing device 100.

Responsive to processing being completed for the user action, in an operation 550, a determination may be made as to whether the individual thread executing the individual API causes an update to the main UI thread for each non-tagged API in the list of APIs. For example, the client computing device 100 (and/or the API determining instructions 123, the API monitoring engine 240, or other resource of the client computing device 100) may determine whether each of the APIs in the list caused the main UI thread to be updated. The client computing device 100 may determine whether each of the APIs in the list caused the main UI thread to be updated in a manner similar or the same as that described above in relation to the execution of the API determining instructions 123, the API monitoring engine 240, and/or other resource of the client computing device 100. In some examples, responsive to the determination, the information related to the API may be updated. In particular, the indicator of whether the API updates the main UI thread may be updated.

Responsive to determining that an individual thread executing the individual non-tagged API causes an update to the main UI thread after completing the processing of the individual non-tagged API, in an operation 560, that API may be tagged as affecting user experience. For example, the client computing device 100 (and/or the API classification instructions 124, the API classification engine 250, or other resource of the client computing device 100) may tag the API as affecting user experience. The client computing device 100 may tag the API as affecting user experience in a manner similar or the same as that described above in relation to the execution of the API classification instructions 124, the API classification engine 250, and/or other resource of the client computing device 100.

Responsive to determining that the individual API does not cause an update to the main UI thread, in an operation 570, the API may be tagged as related to user action. For example, the client computing device 100 (and/or the API classification instructions 124, the API classification engine 250, or other resource of the client computing device 100) may tag the API as related to the user action. The client computing device 100 may tag the API as related to the user action in a manner similar or the same as that described above in relation to the execution of the API classification instructions 124, the API classification engine 250, and/or other resource of the client computing device 100.

Returning to the determination of operation 530, responsive to determining that the API is not related to processing for the user action, the API may be tagged as unrelated to user action in an operation 580. For example, the client computing device 100 (and/or the API classification instructions 124, the API classification engine 250, or other resource of the client computing device 100) may tag the API as unrelated to the user action. The client computing device 100 may tag the API as unrelated to the user action in a manner similar or the same as that described above in relation to the execution of the API classification instructions 124, the API classification engine 250, and/or other resource of the client computing device 100.

The information related to the tagged API may be sent to the server computing device 250 in an operation 590. For example, the client computing device 100 (and/or the API classification instructions 124, the API classification engine 250, or other resource of the client computing device 100) may send the tagged API to the server computing device 250. The client computing device 100 may send the tagged API in a manner similar or the same as that described above in relation to the execution of the API classification instructions 124, the API classification engine 250, and/or other resource of the client computing device 100.

In an operation 595, the list of APIs associated with the user action may be flushed. For example, the client computing device 100 (and/or the API determining instructions 123, the API monitoring engine 240, or other resource of the client computing device 100) may flush the list of APIs. The client computing device 100 may flush the list of APIs in a manner similar or the same as that described above in relation to the execution of the API determining instructions 123, the API monitoring engine 240, and/or other resource of the client computing device 100.

FIG. 7B depicts the exemplary table depicted in FIG. 7A after the flushing of APIs associated with the user action. As described above, a subsequent user action with associated APIs 7 and 8 may be detected before completion of the processing associated with the user action detected at 620. As such, the APIs 7 and 8 associated with the subsequent user action may be listed in the exemplary table but the APIs 1, 2, 3, 4, 5, and 6 associated with the user action detected at 620 may be removed.

The foregoing disclosure describes a number of example embodiments for classifying APIs based on whether the APIs affect user experience. The disclosed examples may include systems, devices, computer-readable storage media, and methods for measuring user action performance. For purposes of explanation, certain examples are described with reference to the components illustrated in FIGS. 1-7B. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Further, the sequence of operations described in connection with FIGS. 1-7B are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

We claim:

1. A non-transitory machine-readable storage medium comprising instructions executable by a processor of a computing device for classifying application protocol interfaces (APIs) to:
  determine that a user action occurred;
  monitor a first thread separate from a user interface (UI) thread of the computing device, where the first thread processes a first application programming interface (API) in response to the occurrence of the user action;
  determine whether the first API being processed on the first thread is related to the user action;
  responsive to the first API being related to the user action, determine whether the first API being processed on the first thread causes the first thread to update the UI thread of the computing device; and
  responsive to the UI thread being updated, tag the first API as affecting user experience.

2. The storage medium of claim 1, further comprising instructions executable by the processor of the computing device to:
  send information related to the tagged first API to a server communicably coupled to the computing device.

3. The storage medium of claim 1, further comprising instructions executable by the processor of the computing device to:
  monitor a second thread separate from the first thread and the UI thread, where the second thread processes a second API in response to the occurrence of the user action;
  determine whether the second API being processed on the second thread is related to the user action;
  responsive to the second API being related to the user action, determine whether the second API being processed on the second thread causes the second thread to update the UI thread of the computing device; and
  responsive to the UI thread not being updated, tag the second API as being related to user action.

4. The storage medium of claim 3,
  wherein the first thread processes a third API unrelated to the user action after the processing of the first API is complete, and
  wherein the storage medium further comprises instructions executable by the processor of the computing device to:
    tag the third API as being unrelated to specific user action.

5. The storage medium of claim 3, further comprising instructions executable by the processor of the computing device to:
  determine which of the first and second APIs cause the UI thread to be updated responsive to all of the updates to the UI thread associated with user action being finished.

6. The storage medium of claim 5, further comprising instructions executable by the processor of the computing device to:
  determine whether all of the updates to the UI thread associated with the user action have finished by comparing a predetermined set of UI updates associated with the user action to a set of UI updates that have occurred.

7. The storage medium of claim 5, further comprising instructions executable by the processor of the computing device to:
  tag the first API and the second API responsive to a determination that all of the UI updates associated with the user action have finished.

8. The storage medium of claim 3, further comprising instructions executable by the processor of the computing device to:
  send information related to the first tagged API and the second tagged API to a server communicably coupled to the computing device.

9. A method for execution by a computing device for classifying application protocol interfaces (APIs), the method comprising:
  determining that a user action occurred;
  responsive to the user action occurring, maintaining a list of APIs that are processed after the occurrence of the user action;
  determining whether a first API of the list of APIs is related to the user action;
  responsive to the first API being related to the user action, determining whether the first API causes an update to a user interface (UI) thread of the computing device; and
  responsive to the first API causing the update, tagging the first API as affecting user experience.

10. The method of claim 9, further comprising:
  determining whether a second API of the list of APIs is related to the user action;
  responsive to the second API being related to the user action, determining whether the second API causes a second update to the UI thread of the computing device; and
  responsive to the second API not causing the second update, tagging the second API as being related to user action.

11. The method of claim 10, further comprising:
  responsive to the second API not being related to the user action, tagging the second API as unrelated to the user action.

12. The method of claim 10, further comprising:
  updating the list of APIs with information related to the tag of the first API and the tag of the second API; and
  sending the list of APIs to a server communicably coupled to the computing device.

13. The method of claim 12, further comprising:
  determining that the first API should be optimized based on the first API being tagged as affecting user experience.

14. A mobile computing device for classifying application protocol interfaces (APIs), the mobile computing device comprising:
  a processor to:
    determine that a user action occurred;
    responsive to the user action occurring, maintain a list of APIs that begin processing after the occurrence of the user action is determined;
    determine whether a first API of the list of APIs is related to the user action;
    responsive to the first API being related to the user action, determine whether the first API causes an update to the UI thread of the computing device;
    responsive to the first API causing the update, tag the first API as affecting user experience;
    determine whether a second API of the list of APIs is related to the user action;

responsive to the second API being related to the user action, determine whether the second API causes a second update to the UI thread of the computing device; and responsive to the second API not causing the second update, tag the second API as related to the user action.

15. The mobile computing device of claim 14, wherein the processor is further to:

determine that processing associated with the user action is complete;

responsive to determining that the processing is complete, perform the tagging of the first API and the second API;

update the list of APIs with information related to the tag of the first API and the tag of the second API; and send the list of APIs to a server communicably coupled to the computing device to be aggregated.

* * * * *